US011999271B2

(12) United States Patent
Ward (10) Patent No.: US 11,999,271 B2
(45) Date of Patent: Jun. 4, 2024

(54) SEAT LATCHING MECHANISM (71) Applicant: Textron Aviation Inc., Wichita, KS (US)

(72) Inventor: Barry John Ward, Bel Aire, KS (US)

(73) Assignee: Textron Innovations Inc., Providence, RI (US)

( * ) Notice: Subject to any disclaimer, the term of this patent is extended or adjusted under 35 U.S.C. 154(b) by 268 days.

(21) Appl. No.: 17/578,546

(22) Filed: Jan. 19, 2022

(65) Prior Publication Data
US 2022/0227263 A1   Jul. 21, 2022

Related U.S. Application Data (60) Provisional application No. 63/138,925, filed on Jan. 19, 2021.

(51) Int. Cl.
*B60N 2/08* (2006.01)
*B60N 2/36* (2006.01)

(52) U.S. Cl.
CPC ........... *B60N 2/0862* (2013.01); *B60N 2/366* (2013.01)

(58) Field of Classification Search
CPC .... B60N 2/0862; B60N 2/0837; B60N 2/366; B60N 2002/952; B64D 11/0639
See application file for complete search history.

(56) References Cited

U.S. PATENT DOCUMENTS

| 3,507,472 | A  | * | 4/1970 | Cojei | B60N 2/0825 248/429 |
| 6,299,120 | B1 | * | 10/2001 | Girardi | B60N 2/01541 297/344.1 |
| 6,488,249 | B1 |   | 12/2002 | Girardi et al. | |
| 2021/0016685 | A1 |   | 1/2021 | Bilgincan et al. | |

FOREIGN PATENT DOCUMENTS

EP    3150426 A1 * 4/2017  ......... B60N 2/01541

* cited by examiner

*Primary Examiner* — Milton Nelson, Jr.
(74) *Attorney, Agent, or Firm* — Avek IP, LLC (57) ABSTRACT

A latching mechanism configured to secure a first component and a second component. The latching mechanism includes a locking plate that operatively engages a first latch plate and a second latch plate. The plates each include an end that inserts into a slot located on the second component, therein securing the first component to the second component. Actuation of the latching mechanism displaces the plates, therein releasing the ends from the slot and allowing for movement of the first component in relation to the second component.

19 Claims, 9 Drawing Sheets

SEAT LATCHING MECHANISM

CROSS-REFERENCE TO RELATED APPLICATIONS

This application claims the benefit of U.S. Provisional Application No. 63/138,925 entitled "Seat Latching Mechanism" and filed on Jan. 19, 2021, which is herein incorporated in its entirety.

BACKGROUND

1. Field

The disclosed embodiments relate generally to the field of latching mechanisms. More specifically, the embodiments relate to a non-binding mechanism for latching and unlatching a moveable component with respect to a stationary component.

2. Description of the Related Art

Seat latching mechanisms exist that maintain the position of a seat along guiderails. For example, U.S. Pat. No. 6,488,249 to Girardi et al. discloses a seat comprising a subassembly that engages a guiderail, allowing the seat to slide along and lock into the guiderails. U.S. Patent Application Publication No. 2021/0016685 to Bilgincan et al. discloses a mounting system for a seat comprising a rail and mounting device, allowing the seat to move along the rail and lock into place using a locking mechanism.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In some aspects, the techniques described herein relate to a latching mechanism configured to secure a first component and a second component, the first component configured for sliding longitudinally with respect to the second component, the latching mechanism including: a locking plate operatively engaging a first latch plate and a second latch plate, wherein the locking plate, the first latch plate, and the second latch plate are each mechanically coupled to the first component; a plurality of slots disposed on the second component, the plurality of slots configured to receive a first end of the first latch plate and a second end of the second latch plate, wherein reception of the first end and the second end into one of the slots secures the first component to the second component; and a first axle operatively coupled to the locking plate, allowing for rotation of the locking plate therearound, wherein rotation of the locking plate in a first direction removes the first end and the second end from one of the slots, therein releasing the first component from the second component.

In some aspects, the techniques described herein relate to a latching system configured to transition a first component and a second component between a secured orientation and a released orientation, the latching system including: a connecting member mechanically coupled to a locking plate; a first axle operatively connected to the locking plate, wherein actuation of the connecting member in a first direction causes rotation of the locking plate around the first axle in a second direction; a first latch plate and a second latch plate operatively engaged by the locking plate, wherein rotation of the locking plate displaces a first end of the first latch plate and a second end of the second latch plate; a plurality of slots configured to receive the first end and the second end, wherein reception of the first end and the second end into one of the plurality of slots places the latching system in the secured orientation.

In some aspects, the techniques described herein relate to a seat latching system configured to adjust a position of a moveable seat frame in relation to a stationary seat frame, the seat latching system including: a lever operatively connected to a connecting member; a locking plate operatively connected to the connecting member and a first axle; a first cylindrical member disposed on a first latch plate, the first cylindrical member operatively engaged by the locking plate; a second cylindrical member operatively connecting the first latch plate to a second latch plate; and a plurality of slots disposed on the stationary seat frame, the plurality of slots configured to receive a first end of the first latch plate and a second end of the second latch plate, wherein actuation of the lever causes the connecting member to move in a first direction, causing rotation of the locking plate around the first axle in a second direction, wherein rotation of the locking plate in the second direction releases the first end and the second end from one of the slots, thereby allowing the position of the moveable seat frame to be adjusted.

BRIEF DESCRIPTION OF THE SEVERAL VIEWS OF THE DRAWINGS

Illustrative embodiments are described in detail below with reference to the attached drawing figures, which are incorporated by reference herein and wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Traditional lock pins often bind when inserting into, or withdrawing from, a hole or notch in a component. An edge of the lock pin presses against an inner surface or edge of the hole or slot, which creates friction with the lock pin. When the component is loaded, the increased friction can make insertion or withdrawal of the lock pin difficult.

Embodiments of the present disclosure provide a locking mechanism with latch plates that move away from the inner surface or edge of the hole or slot, which removes any friction in the mechanism as the latch plates are withdrawn from the hole or slot, thereby preventing binding up of the locking mechanism.

Figure 1:
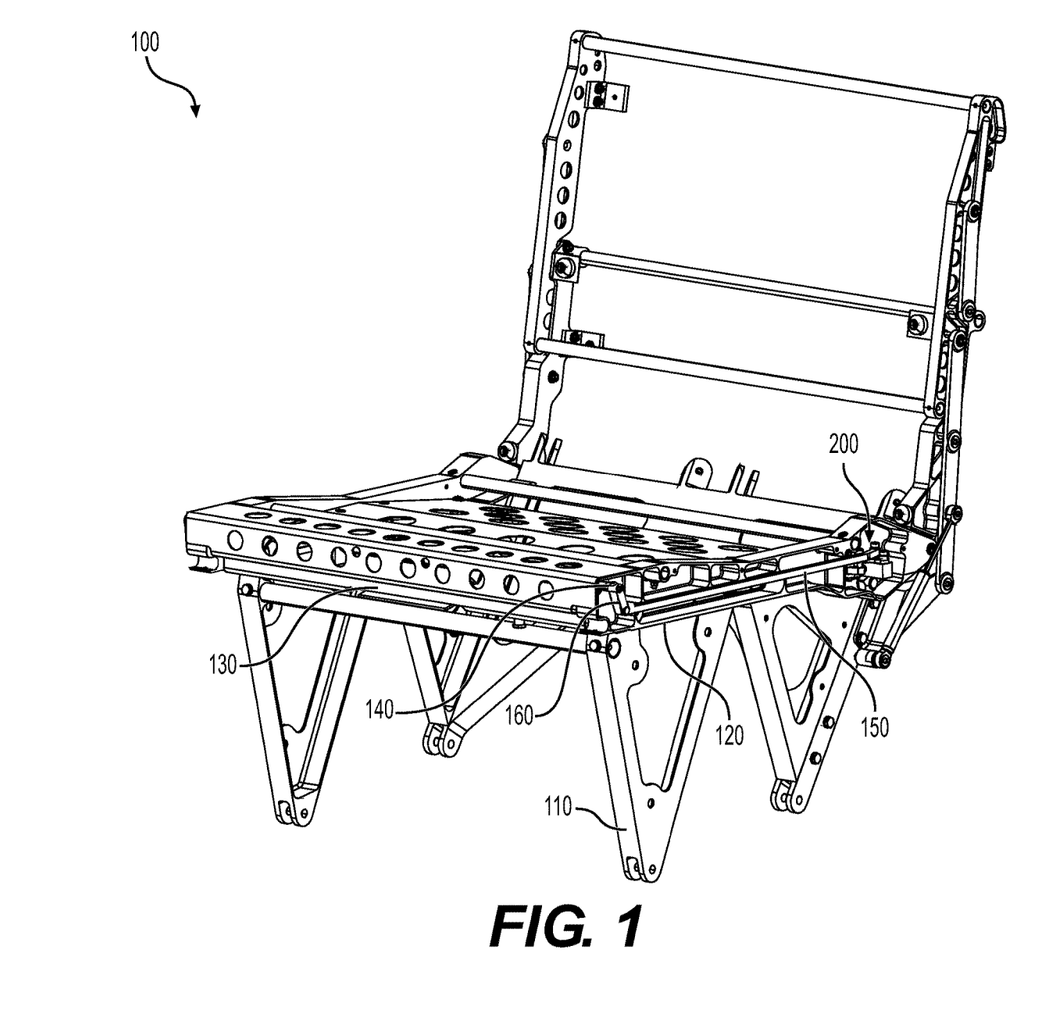
FIG. 1 is perspective view of a seat with a seat base having a seat latching mechanism installed thereon, in an embodiment.

FIG. 1 is perspective view of a seat base 100 configured with an exemplary seat latching mechanism 200 installed thereon. Seat base 100 includes a stationary seat frame 110 and a moveable seat frame 120 that is configured for moving with respect to stationary seat frame 110. For example, stationary seat frame 110 has a plurality of legs configured for mounting to a floor of a vehicle (e.g., motor vehicle, electric vehicle, aircraft, etc.), such that stationary seat frame 110 is mechanically coupled to the floor for remaining stationary with respect to the vehicle. Moveable seat frame 120 is for example a bucket frame of a bucket assembly configured to support a seat bottom of a seat. Moveable seat frame 120 is configured to slide back and forth in a longitudinal direction (e.g., forward and aft with respect to the vehicle). Seat latching mechanism 200, which is further described below in connection with FIGS. 3-9, is configured to latch and unlatch for securing and releasing moveable seat frame 120, respectively.

An exemplary user release system is configured for enabling a user to actuate seat latching mechanism 200 for securing and releasing moveable seat frame 120. The user release system provides a manually actuated mechanism that includes a lever 130, an axle 140, a connecting member 150, and a linkage 160. A user may pull on lever 130 to release seat latching mechanism 200 via axle 140, connecting member 150, and linkage 160, as further described below in connection with FIG. 2.

Figure 2:
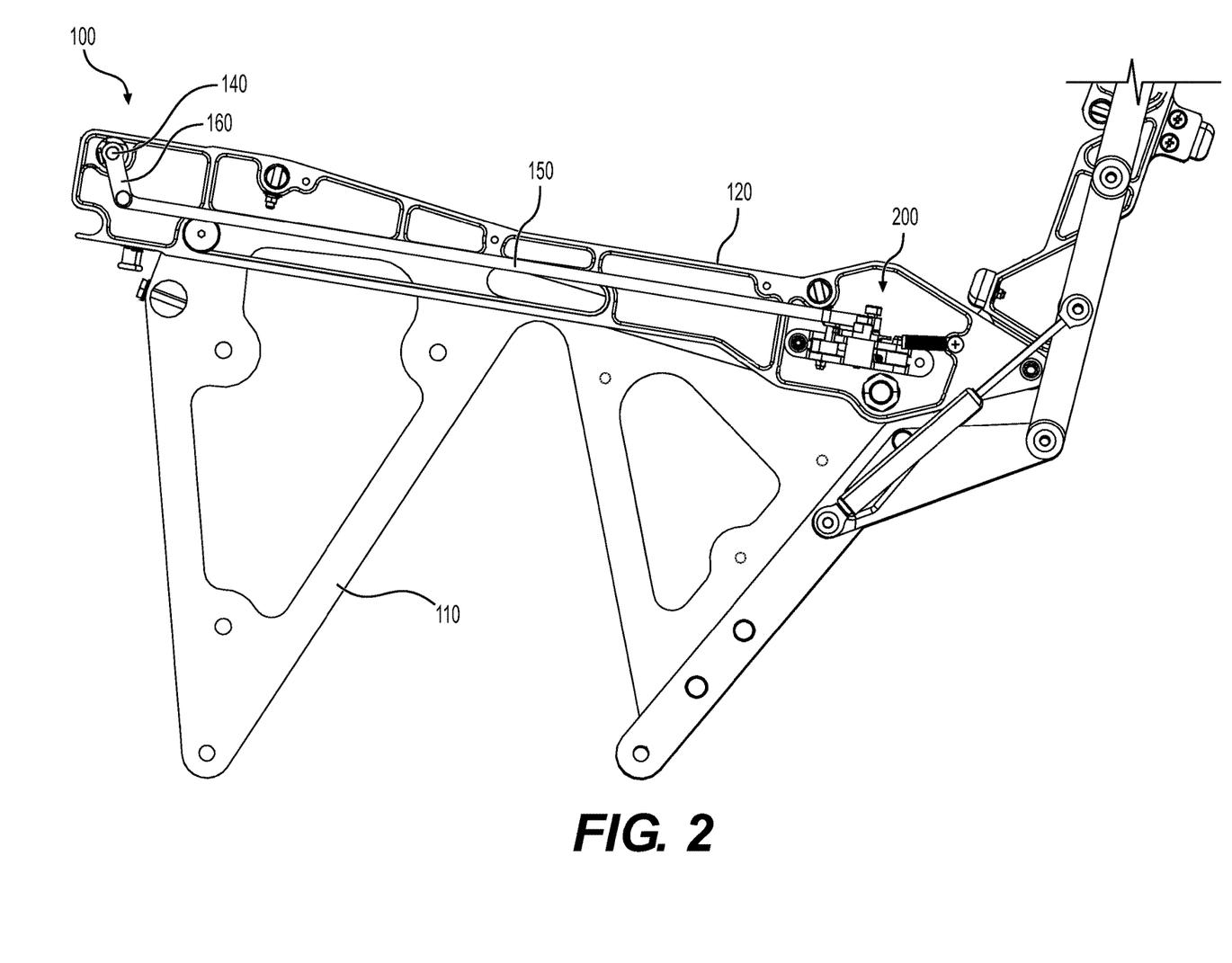
FIG. 2 is side view of the seat base having the seat latching mechanism of FIG. 1 installed thereon.

FIG. 2 is side view of seat base 100 having seat latching mechanism 200 installed thereon. Axle 140 is configured for rotating about its axis. Linkage 160 has a first end that is mechanically coupled with axle 140, such that rotation of axle 140 causes pivoting of linkage 160. A second end of linkage 160, opposite the first end, is pivotably coupled with connecting member 150, such that pivoting of linkage 160 causes lengthwise movement of connecting member 150.

In operation, lever 130 (see FIG. 1), which is mechanically coupled to axle 140, is pulled by a user outwardly in front of seat base 100. Pulling of lever 130 causes axle 140 to rotate (e.g., in a clockwise direction as viewed in FIG. 2), which pivots linkage 160 to rotate in the same direction. As linkage 160 is rotated, it pulls connecting member 150, which actuates seat latching mechanism 200 causing release of seat latching mechanism 200 for enabling movement of moveable seat frame 120 with respect to stationary seat frame 110. Operation of seat latching mechanism 200 is described below in connection with FIGS. 3-9.

Alternatively, a motorized user release system may be employed (not shown). For example, a motor may be configured to push/pull connecting member 150, and the user may activate the motor via e.g., a switch electrically coupled with the motor, or a user interface communicatively coupled for controlling the motor.

Figure 3:
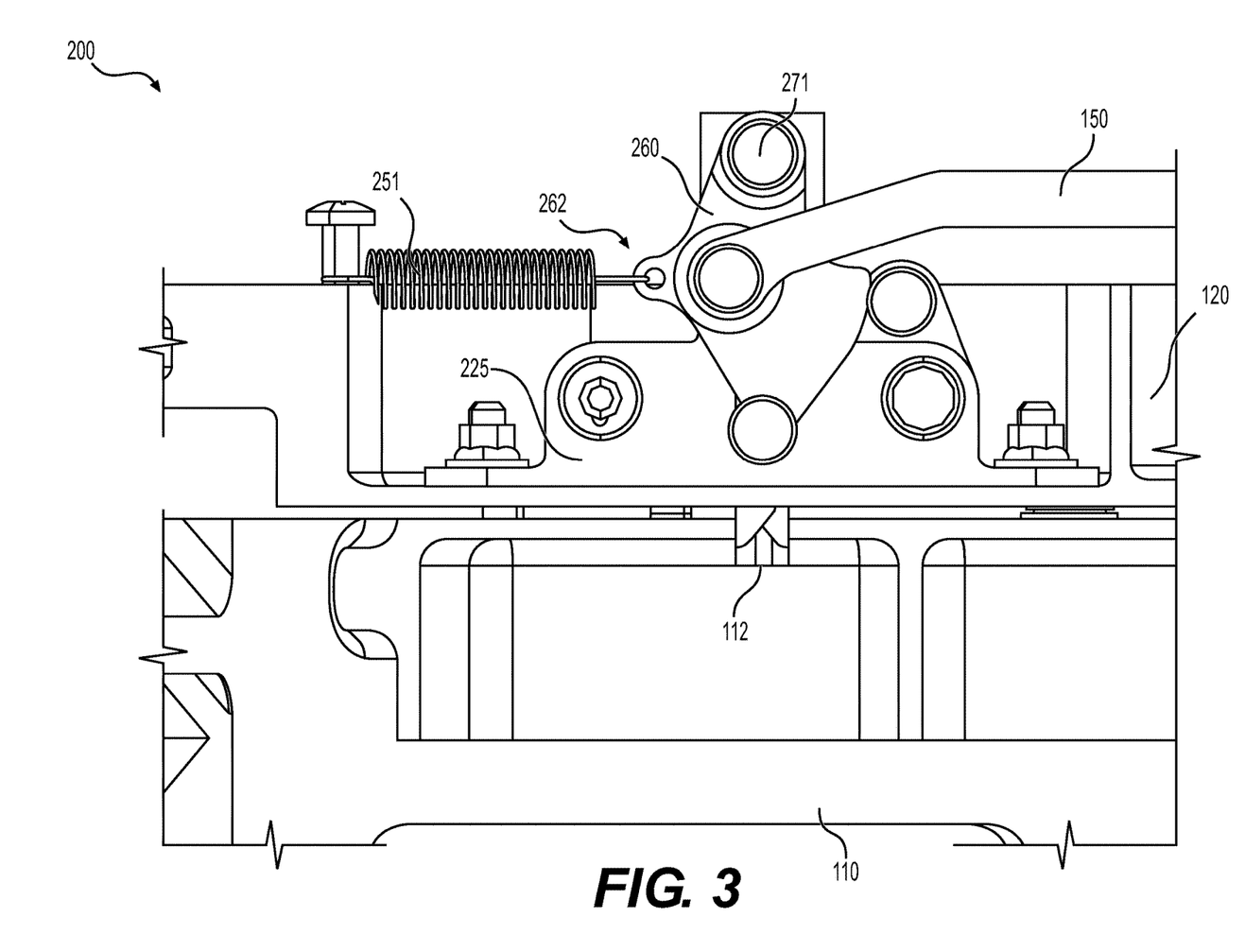
FIG. 3 is a front view of the seat latching mechanism of FIG. 1.

FIG. 3 is a front view of seat latching mechanism 200 installed on seat base 100. For the purposes of this disclosure, the views of seat latching mechanism 200 as depicted in FIGS. 3, 4, 6, and 8 in which locking plate 260 and connecting member 150 are viewable is defined as a "front view". It is noted that the front view is a top-down view of the seat latching mechanism 200 of FIGS. 1-2. Conversely, the opposing views of seat latching mechanism 200 as depicted in FIGS. 2, 5, 7 and 9 are defined as a "back view". It is noted that the back view is a down-up view of the seat latching mechanism 200 of FIGS. 1-2. However, it is contemplated that seat latching mechanism 200 may be in any orientation (e.g., vertical, sideways, diagonal, etc.) that allows for adjustment of moveable seat frame 120. In FIGS. 3-9, portions drawn with light lines indicate components that are normally hidden from view by other components.

A mounting bracket 225 is used to mechanically couple components of seat latching mechanism 200 with moveable seat frame 120. A locking plate 260 is coupled to a first spring 251 via an eyelet 262 for biasing locking plate 260 in a securing position. Locking plate 260 is pivotable about a first axle 271 and is configured for actuating movement of a second latch plate 282 and a first latch plate 281, as further described below in connection with FIGS. 4-9. Second latch plate 282 and first latch plate 281 are configured for insertion into a slot 112 located in an upper surface of stationary seat frame 110. Stationary seat frame 110 may include more than one slot 112 for enabling moveable seat frame 120 to be secured to stationary seat from 110 in more than one corresponding position. For example, moveable seat frame 120 may be secured in a first position configured for a user to sit upright, a second position for the user to sit in a reclined posture, and a third position for the user to lie down.

Figure 4:
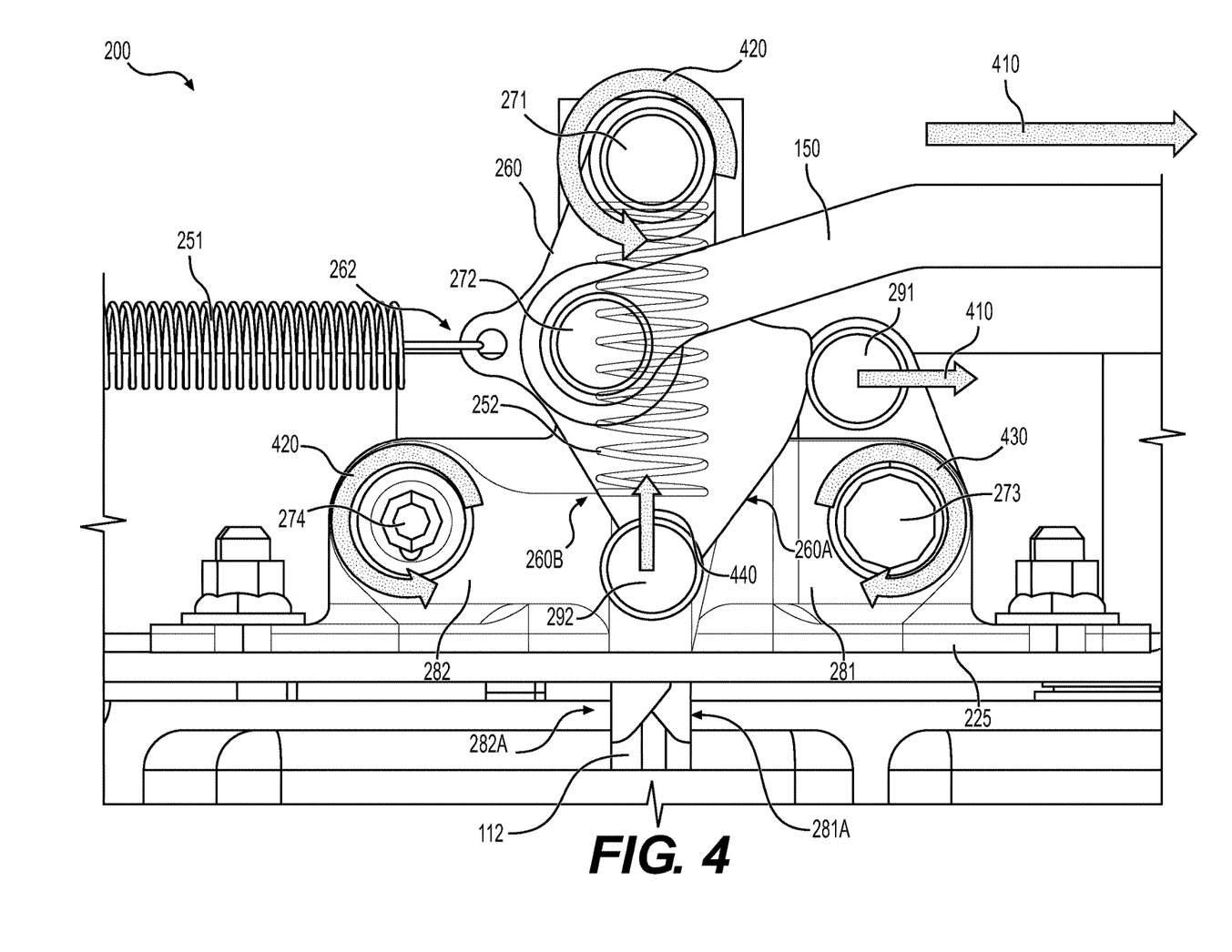
FIG. 4 is a front view of the seat latching mechanism of FIG. 1 positioned in a locked orientation.

FIG. 4 is a front view of seat latching mechanism 200 positioned in a locked orientation. Specifically, second latch plate 282 and first latch plate 281 are fully deployed in a downward position such that ends of second latch plate 282 and first latch plate 281 extend beneath a lower edge of mounting bracket 225 for insertion into a slot for locking thereto (e.g., slot 112 shown in FIG. 3). A second end 282a of second latch plate 282 is configured for pressing against a first inner wall of slot 112, and a first end 281a of first latch plate 281 is configured for pressing against a second inner wall of slot 112, opposite the first inner wall.

In FIG. 4, the arrows 410, 420, 430, and 440 indicate directions of movement for various components as seat latching mechanism 200 is actuated for release. As further described below, components move in the directions indicated in FIG. 4 to transition seat latching mechanism 200 from the locked orientation shown in FIGS. 4 and 5, through the in-between position shown in FIGS. 6 and 7, to the released orientation shown in FIGS. 8 and 9.

Connecting member 150 is pivotally coupled with locking plate 260 via a fourth axle 272. As connecting member 150 is pulled in a first direction 410, locking plate 260 is pulled via fourth axle 272 causing locking plate 260 to rotate about first axle 271 in a second direction 420 indicated in FIG. 4.

First cylindrical member 291 is mechanically coupled to first latch plate 281 such that first latch plate 281 rotates about a second axle 273 in a third direction 430. A second cylindrical member 292 is mechanically coupled with first latch plate 281 such that second cylindrical member 292 moves in a fourth direction 440 as first latch plate 281 rotates in the third direction 430. This will be discussed in greater detail below.

Second latch plate 282 has a hole configured to accept second cylindrical member 292. This enables second cylindrical member 292 to push second latch plate 282, thereby coordinating movement between first latch plate 281 and second latch plate 282. For example, when first latch plate 281 rotates in third direction 430, second cylindrical member 292 moves in the fourth direction 440 causing rotation of second latch plate 282 in the second direction 420 about a third axle 274.

A second spring 252 is configured to push downwardly on second latch plate 282 and first latch plate 281. Second spring 252 is housed within an internal bore of mounting bracket 225 and is partially viewable in FIG. 6. In the back views of FIGS. 5, 7, and 9, mounting bracket 225 is rendered partially transparent to enable viewing of second spring 252 within the internal bore of mounting bracket 225. In the view of FIG. 4, second spring 252 is invisibly located behind locking plate 260 (see FIGS. 6 and 8) and is instead graphically illustrated to indicate its presence for clarity. Second spring 252 is configured to bias second latch plate 282 and first latch plate 281 downwardly, thereby assisting first spring 251 with the transition to the locked orientation.

For the front view depicted in FIG. 4, first direction 410 is a substantially horizontal direction towards the right, second direction 420 is a counterclockwise rotation, third direction 430 is a clockwise rotation, and fourth direction 440 is a substantially upwards vertical direction. In the other front views of FIGS. 6 and 8, the directions of movement are the same. In the back views of FIGS. 5, 7, and 9, the horizontal and rotational directions are opposite that of FIG. 4. It is noted that seat base 100 may comprise a seat latching mechanism on both sides of the frame. Therefore, as is evident to one skilled in the art, the clockwise and counterclockwise directions may be alternative depending on the viewing angle and/or the side of seat base 100 that seat latching mechanism 200 is located on.

Figure 5:
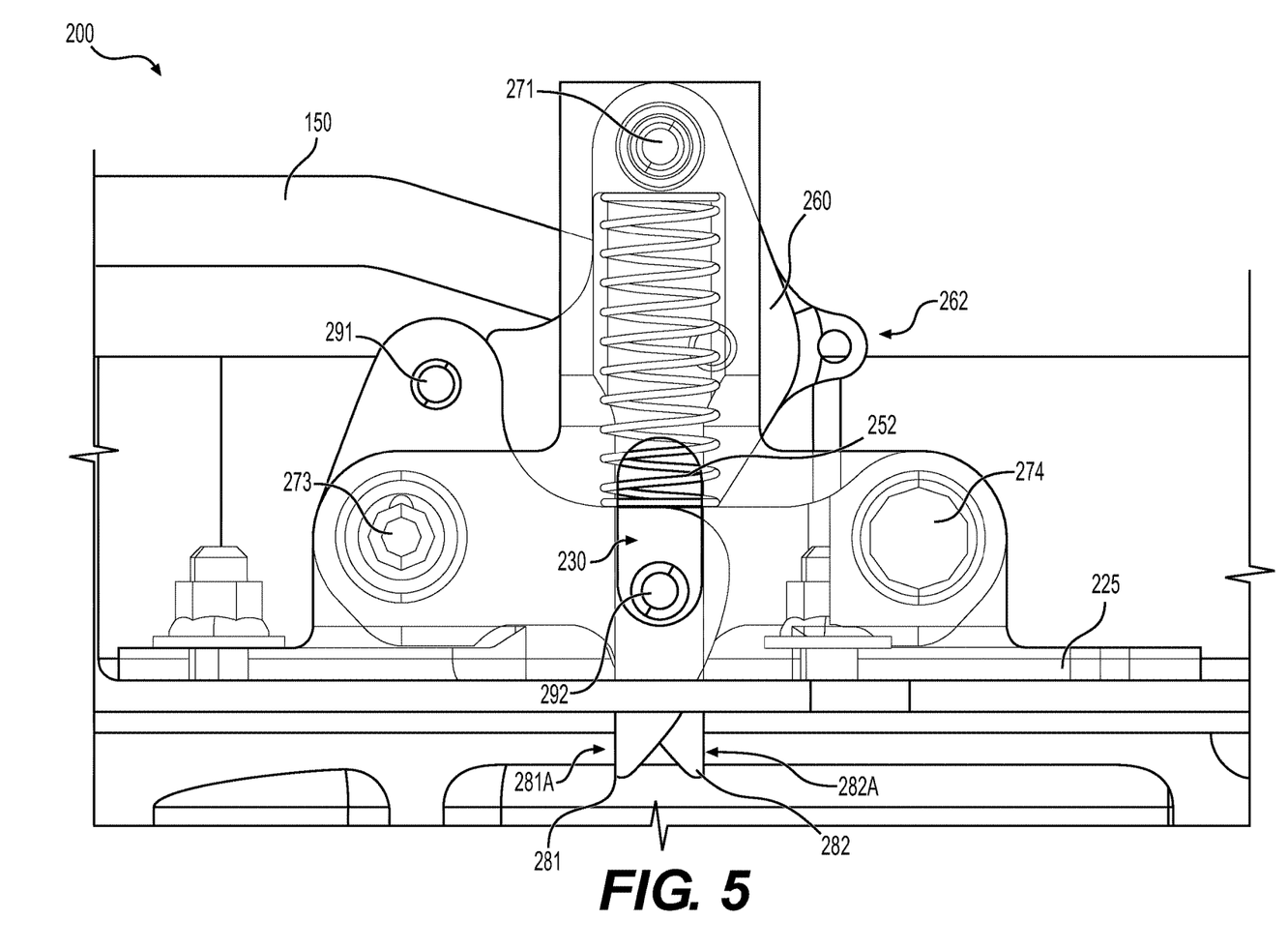
FIG. 5 is a back view of the seat latching mechanism of FIG. 4 positioned in the locked orientation.

FIG. 5 is a back view of the seat latching mechanism of FIG. 4 positioned in the locked orientation. From the back view of FIG. 5, second spring 252 and a channel 230 are viewable. Channel 230 is formed in mounting bracket 225 and is configured to constrain second cylindrical member 292 as it moves upwardly from the bottom of channel 230 as shown in FIGS. 4 and 5, to near the middle of channel 230 as shown in FIGS. 6 and 7, to the top of channel 230 as shown in FIGS. 8 and 9.

Figure 6:
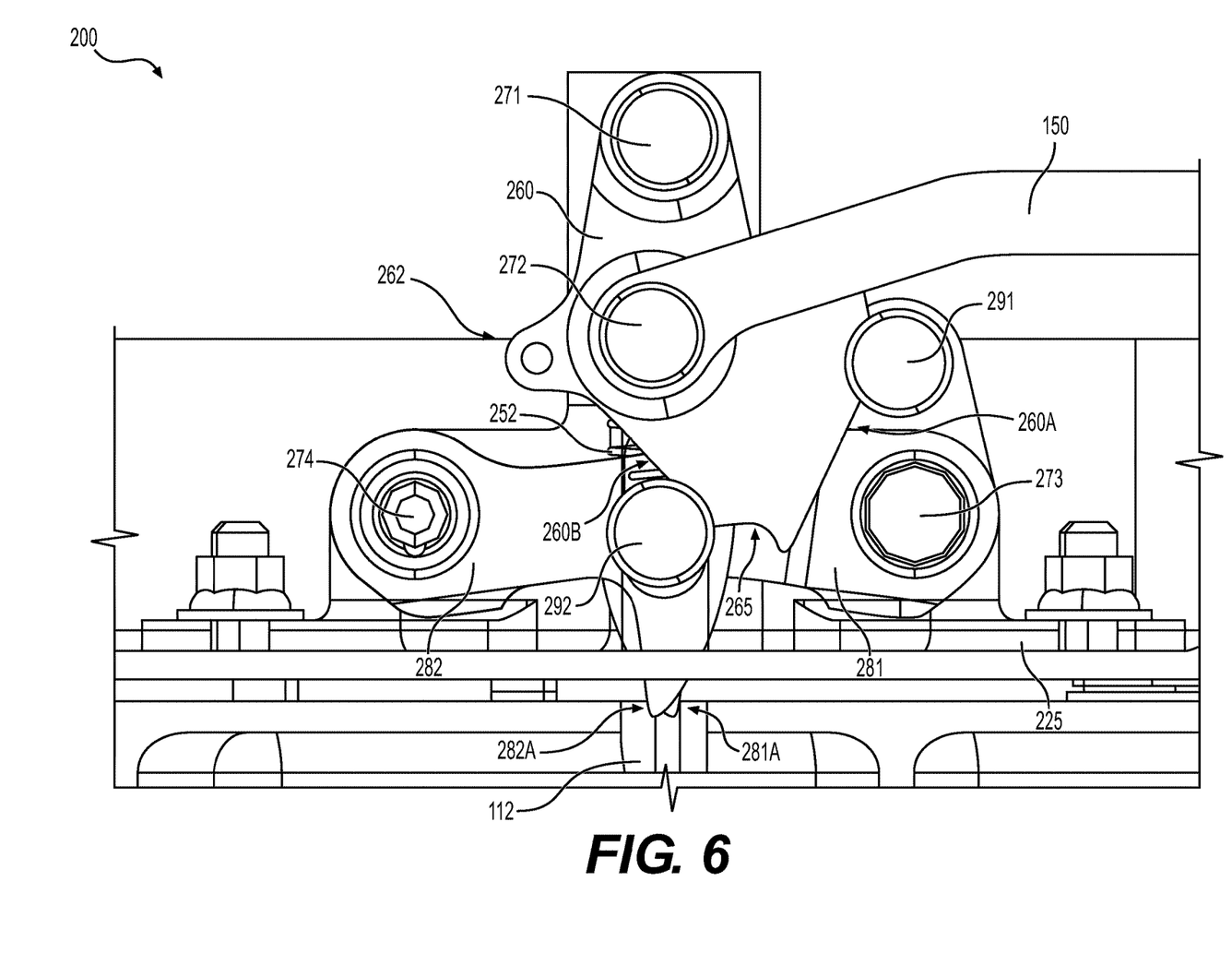
FIG. 6 is a front view of the seat latching mechanism of FIG. 1 positioned in transition between the locked orientation of FIG. 4 and the released orientation of FIG. 8.
Figure 8:
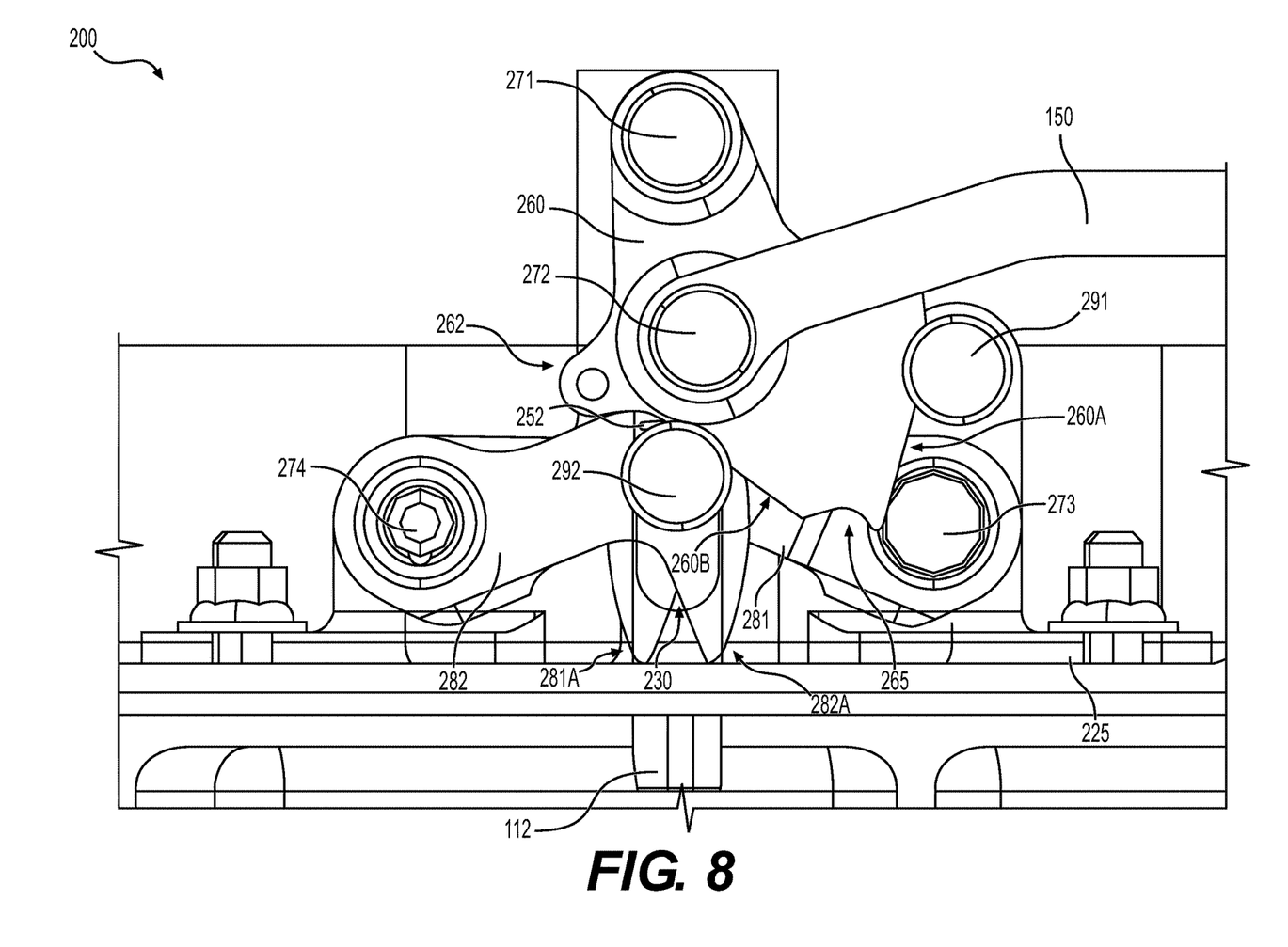
FIG. 8 is a front view of the seat latching mechanism of FIG. 1 positioned in the released orientation.

FIG. 6 is a front view of seat latching mechanism 200 positioned in transition between the locked orientation of FIG. 4 and the released orientation of FIG. 8. Specifically, second latch plate 282 and first latch plate 281 are partially rotated such that the ends of second latch plate 282 and first latch plate 281 are partially withdrawn inwardly and upwardly. The second end 282a of second latch plate 282 and the first end 281a of first latch plate 281 have moved inwardly to avoid contacting inner walls of slot 112.

Figure 7:
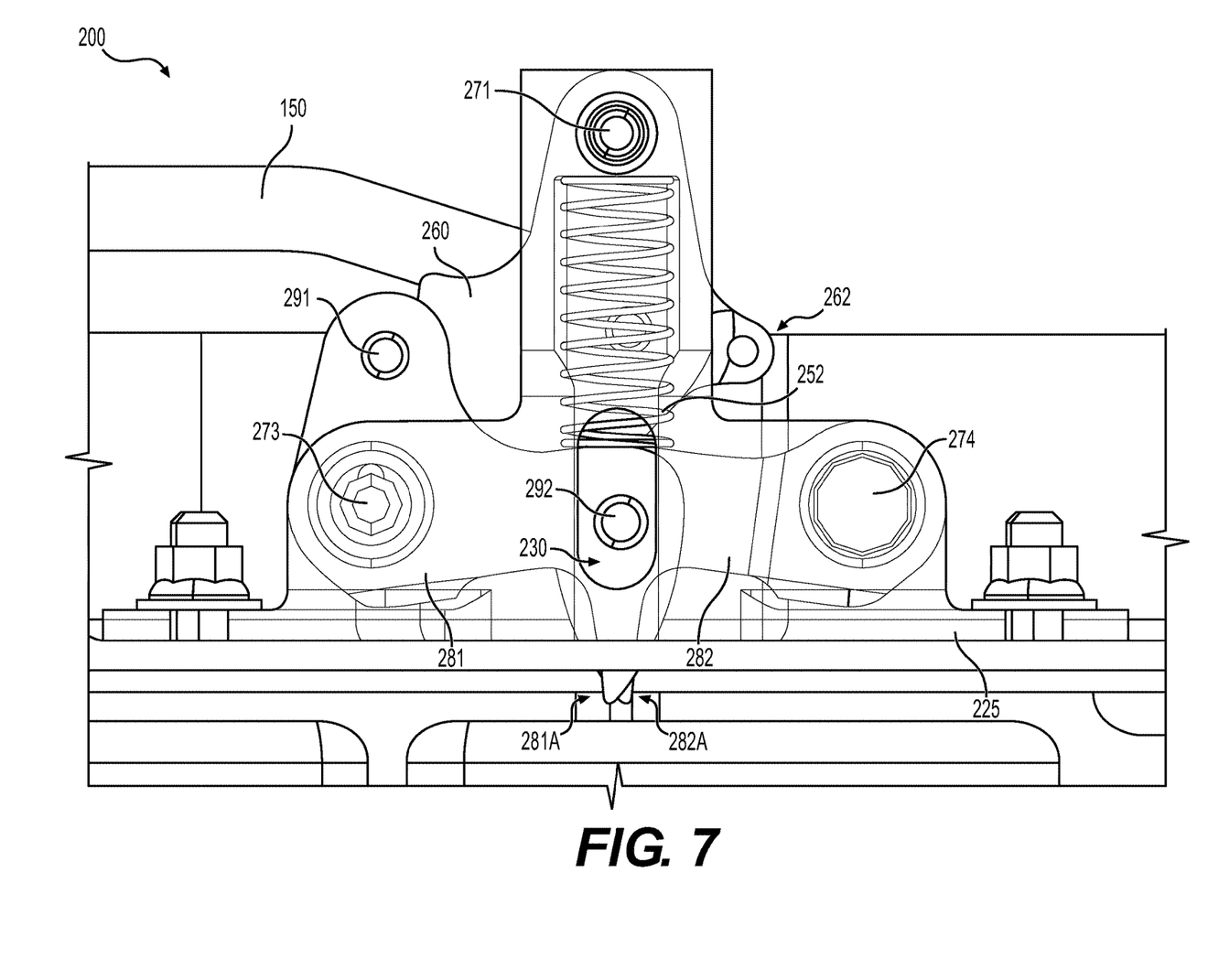
FIG. 7 is a back view of the seat latching mechanism of FIG. 6 positioned in transition between the locked orientation of FIG. 5 and the released orientation of FIG. 9.
Figure 9:
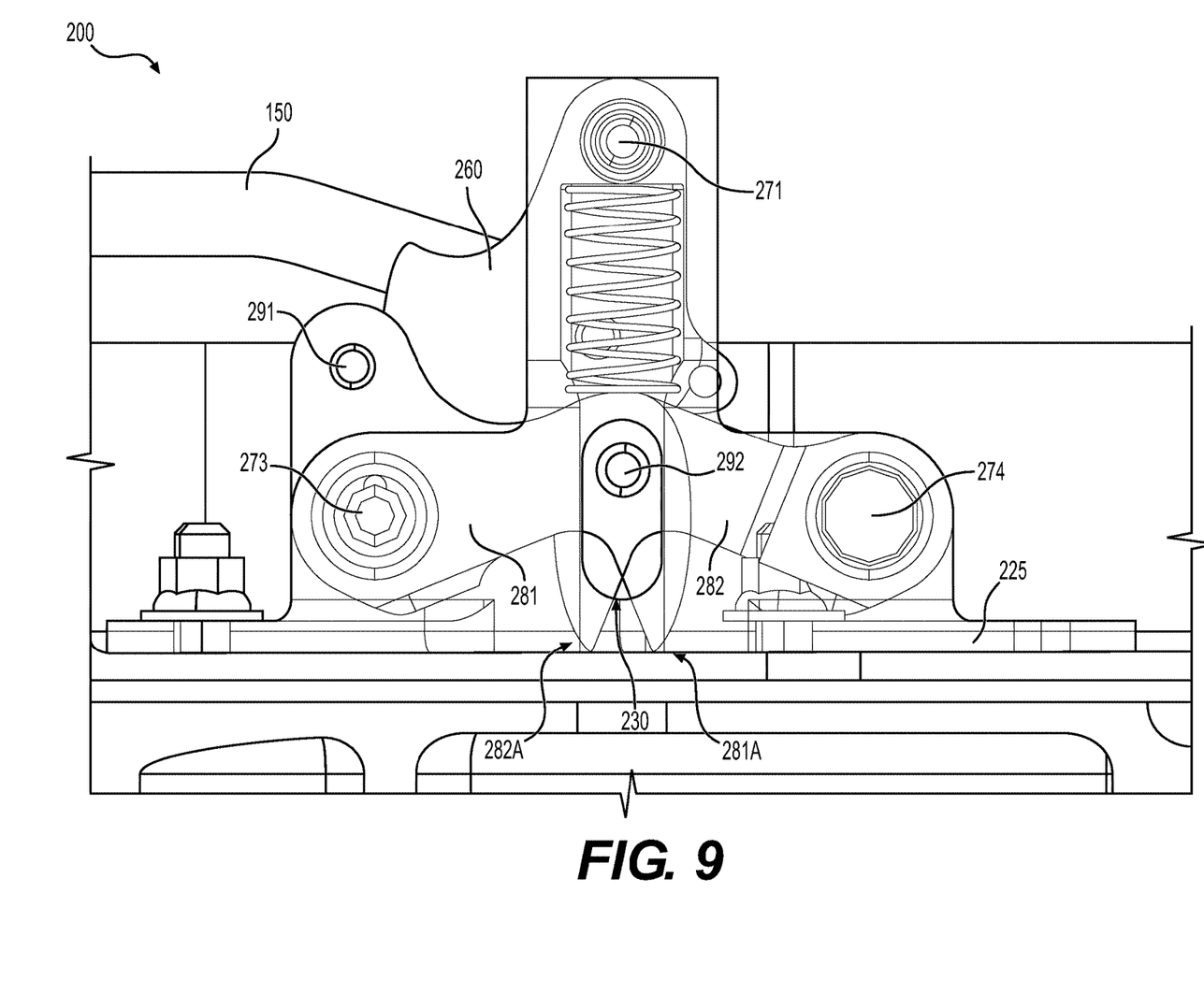
FIG. 9 is a back view of the seat latching mechanism of FIG. 8 positioned in the released orientation.

FIG. 7 is a back view of the seat latching mechanism of FIG. 6 positioned in transition between the locked orientation of FIG. 5 and the released orientation of FIG. 9. Second cylindrical member 292 is positioned between the bottom and top of channel 230. Note that second cylindrical member 292 is slightly off-center (e.g., horizontally to the right of center) in FIG. 7 because second cylindrical member 292 moves upwardly along an arc as first latch plate 281 rotates upwardly.

FIG. 8 is a front view of seat latching mechanism 200 oriented in the released orientation. Specifically, second latch plate 282 and first latch plate 281 are fully withdrawn upwardly such that ends of second latch plate 282 and first latch plate 281 are lifted above the lower edge of mounting bracket 225. In the released orientation depicted in FIG. 8, the ends of second latch plate 282 and first latch plate 281 are raised for clearing any slot beneath mounting bracket 225 (e.g., slot 112 of stationary seat frame 110).

FIG. 9 is a back view of the seat latching mechanism of FIG. 8 positioned in the released orientation. As viewable in FIG. 9, second cylindrical member 292 is positioned near the top of channel 230. FIGS. 4-9 are best viewed together with the following description.

In operation, as seat latching mechanism 200 is actuated for release via connecting member 150, its components move in the directions 410, 420, 430, and 440 indicated in FIG. 4 such that the ends of second latch plate 282 and first latch plate 281 rise inwardly and upwardly, transitioning through the in-between orientation depicted in FIGS. 6 and 7 to the released orientation depicted in FIGS. 8 and 9.

When seat latching mechanism 200 is no longer actuated for release, first spring 251 pulls locking plate 260 via eyelet 262 (see FIG. 3) while locking plate 260 pushes downwardly on second cylindrical member 292. This counterrotates locking plate 260 in a direction opposite that of second direction 420 and pulls connecting member 150 in a direction opposite that of first direction 410. As locking plate 260 counterrotates, second spring 252 pushes second latch plate 282 and first latch plate 281 downwardly (in the opposite of fourth direction 440), which counterrotates second latch plate 282 in a direction opposite that of second direction 420 and counterrotates first latch plate 281 in a direction opposite that of third direction 430. In other words, when first spring 251 and second spring 252 return seat latching mechanism 200 from the released orientation to the locked orientation of FIG. 4, all the components of seat latching mechanism 200 move opposite the directions indicated in FIG. 4.

First cylindrical member 291 and second cylindrical member 292 are for example bolts that are threaded into first latch plate 281. Optionally, one or more of the first cylindrical member 291 and second cylindrical member 292 comprise a soft coating (e.g., rubber) to soften the noise of the locking plate 260 as it transitions between the locked and released orientations. First axle 271, fourth axle 272, second axle 273, and third axle 274 are for example bolts or pins configured for enabling rotation about the axle by one or more components. The bolts/pins may have an end cap on one end, and the latch/locking plates may contact the bolts/pins inside the end cap. Optionally, one or more of the axles each include a plain bearing around an outer diameter of the axle to reduce friction during rotation of the one or more components.

When installed on seat base 100, as shown in FIGS. 1-3, seat latching mechanism 200 is mounted to moveable seat frame 120 while the ends of second latch plate 282 and first latch plate 281 are configured for insertion into slot 112, which is in stationary seat frame 110, such that in the locked orientation, seat latching mechanism 200 prevents movement of moveable seat frame 120 with respect to stationary seat frame 110.

In the locked orientation, the ends 281*a*, 282*a* of first and second latch plates 281, 282, respectively, press against inner walls of slot 112 in opposing directions thereby preventing movement of seat latching mechanism 200 in the opposing directions.

To release seat latching mechanism 200, second latch plate 282 and first latch plate 281 rotate such that second end 282*a* and first end 281*a* move inwardly away from the opposing inner walls of slot 112 thereby removing potential friction and enabling second latch plate 282 and first latch plate 281 to freely and smoothly rotate upwardly out of slot 112 without binding. As described above, stationary seat frame 110 may include more than one of slot 112 such that moveable seat frame 120 may be secured in more than one corresponding location.

In situations where moveable seat frame 120 is loaded (e.g., a user is weighting moveable seat frame 120), either one of second end 282*a* or first end 281*a* may be pressed against an inner wall of slot 112 creating friction that could cause binding or otherwise make withdrawal of the corresponding latch plate somewhat difficult. By moving second end 282*a* and first end 281*a* inwardly and away from the opposing inner walls of slot 112, friction is alleviated, and binding is avoided, which enables second latch plate 282 and first latch plate 281 to be smoothly and easily retracted from slot 112.

As indicated in FIG. 6 and FIG. 8, locking plate 260 includes a notch 265, which is shaped to accept a portion of the outer diameter of second cylindrical member 292. When connecting member 150 is no longer actuated (e.g., via the user release system and lever 130), first spring 251 counterrotates locking plate 260 until second cylindrical member 292 is received by notch 265, which prevents further movement of locking plate 260 beyond the locked orientation. Notch 265 provides a hard stop that ensures locking plate 260 remains in the locked orientation (as shown in FIG. 4), resisting first and second springs 251, 252, until the user release system is once again used to actuate seat latching mechanism 200 via connecting member 150. When locking plate 260 is first actuated, it rotates about first axle 271 in first direction 410 (see FIG. 4) until the notch 265 portion of locking plate 260 moves beside second cylindrical member 292 as depicted in FIG. 6.

Locking plate 260 has a first edge 260*a* and a second edge 260*b*. Second edge 260*b* of locking plate 260 is shaped to allow second cylindrical member 292 to move upwardly when the notch 265 portion of locking plate 260 rotates clear of second cylindrical member 292 (e.g., as depicted in FIG. 6).

First edge 260*a* is shaped such that as locking plate 260 rotates in second direction 420, it pushes a first cylindrical member 291 in the first direction 410. An upper portion of first edge 260*a* is slightly curved, followed by a middle portion that bows outwardly, and followed by a lower portion that is substantially straight. A small gap exists between first edge 260*a* and main body (e.g., behind the end cap) of second cylindrical member 292 such that as rotation of locking plate 260 in second direction 420 initiates, first cylindrical member 291 does not move. Then, as locking plate 260 rotates, the outwardly bowed portion of first edge 260*a* contacts first cylindrical member 291 and displaces it in first direction 410 to the in-between position depicted in FIG. 6. With further rotation of locking plate 260, contact of first cylindrical member 291 transitions to the lower (and straighter) portion of first edge 260*a*, and displacement of first cylindrical member 291 decreases as the released orientation is approached (see FIG. 8).

Optionally, one or both of the first edge 260*a* and second edge 260*b* comprise a soft material (e.g., rubber), such that movement of the edges 260*a*, 206*b* along a portion of the first cylindrical member 291 and second cylindrical member 292, respectively, is smooth.

Embodiments disclosed herein provide a seat latching mechanism for use in aircraft seats, automobile seats, or recreational vehicles; however, seat latching mechanism 200 could be used to conveniently secure and release any two components intended for motion therebetween.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A latching mechanism configured to secure a first component and a second component, the first component configured for sliding longitudinally with respect to the second component, the latching mechanism comprising:
   a locking plate operatively engaging a first latch plate and a second latch plate, wherein the locking plate, the first latch plate, and the second latch plate are each mechanically coupled to the first component;
   a first cylindrical member disposed on the first latch plate,
   a second cylindrical member operatively connecting the first latch plate and the second latch plate,
   a plurality of slots disposed on the second component, the plurality of slots configured to receive a first end of the first latch plate and a second end of the second latch plate,
      wherein reception of the first end and the second end into one of the slots secures the first component to the second component; and
   a first axle operatively coupled to the locking plate, allowing for rotation of the locking plate therearound,
      wherein rotation of the locking plate displaces the first cylindrical member and the second cylindrical member; and
      wherein rotation of the locking plate in a first direction removes the first end and the second end from one of the slots, therein releasing the first component from the second component.

2. The latching mechanism of claim 1, further comprising:
a second spring operatively connected to one or both of the first latch plate and the second latch plate, the second spring biasing one or both of the first end and the second end towards the plurality of slots.

3. The latching mechanism of claim 1, wherein rotation of the locking plate in the first direction displaces the first cylindrical member in a second direction.

4. The latching mechanism of claim 1, wherein rotation of the locking plate in the first direction allows for displacement of the second cylindrical member in a third direction.

5. The latching mechanism of claim 1, further comprising:
a second axle operatively connected to the first latch plate allowing for rotation therearound; and
a third axle operatively connected to the second latch plate allowing for rotation therearound.

6. The latching mechanism of claim 1, further comprising:
a first spring operatively connected to the locking plate, the first spring biasing the locking plate against rotation in the first direction.

7. A latching system configured to transition a first component and a second component between a secured orientation and a released orientation, the latching system comprising:
a connecting member mechanically coupled to a locking plate;
a first axle operatively connected to the locking plate, wherein actuation of the connecting member in a first direction causes rotation of the locking plate around the first axle in a second direction;
a first latch plate and a second latch plate operatively engaged by the locking plate, wherein rotation of the locking plate displaces a first end of the first latch plate and a second end of the second latch plate;
a plurality of slots configured to receive the first end and the second end,
wherein reception of the first end and the second end into one of the plurality of slots places the latching system in the secured orientation.

8. The latching system of claim 7, wherein in the secured orientation, the first end and the second end are in the same slot.

9. The latching system of claim 7, wherein displacement of the first end and the second end occurs via rotation of the first latch plate around a second axle and rotation of the second latch plate around a third axle.

10. The latching system of claim 7, further comprising:
a first spring operatively connected to the locking plate, the first spring biasing the locking plate opposite the first direction.

11. The latching system of claim 7, further comprising:
a second spring operatively connected to the first latch plate and the second latch plate, the second spring biasing the first end and the second end towards the plurality of slots.

12. The latching system of claim 7, wherein rotation of the locking plate in the second direction biases a portion of the first latch plate in the first direction.

13. The latching system of claim 8, wherein the first end biases against a first inner wall of the slot and the second end biases against a second inner wall of the slot, the first wall and the second wall being opposing walls.

14. A seat latching system, the seat latching system comprising:
a stationary seat frame;
a movable seat frame which is configured to move relative to the stationary seat frame;
a lever operatively connected to a connecting member;
a locking plate operatively connected to the connecting member and a first axle;
a first cylindrical member disposed on a first latch plate, the first cylindrical member operatively engaged by the locking plate;
a second cylindrical member operatively connecting the first latch plate to a second latch plate; and
a plurality of slots disposed on the stationary seat frame, the plurality of slots configured to receive a first end of the first latch plate and a second end of the second latch plate,
wherein actuation of the lever causes the connecting member to move in a first direction, causing rotation of the locking plate around the first axle in a second direction,
wherein rotation of the locking plate in the second direction releases the first end and the second end from one of the slots, thereby allowing the position of the moveable seat frame to be adjusted.

15. The seat latching system of claim 14, wherein the locking plate comprises:
a first edge operatively engaging the first cylindrical member; and
a second edge operatively engaging the second cylindrical member,
wherein the second edge comprises a notch configured to receive the second cylindrical member.

16. The seat latching system of claim 14, wherein rotation of the locking plate in the second direction pushes the first cylindrical member in the first direction, causing the first latch plate to rotate around a second axle in a third direction.

17. The seat latching system of claim 14, wherein rotation of the locking plate in the second direction pushes the second cylindrical member in a fourth direction, causing the second latch plate to rotate around a third axle in the second direction.

18. The seat latching system of claim 14, further comprising:
a first spring operatively connected to the locking plate, the first spring biasing the locking plate opposite the first direction; and
a second spring operatively connected to the second cylindrical member, the second spring biasing the first end and the second end towards the plurality of slots.

19. The seat latching system of claim 14, wherein upon release of the lever, the first latch plate rotates in the second direction and the second latch plate rotates in a third direction, biasing the first end and the second end towards the plurality of slots.

* * * * *